Feb. 24, 1931.   W. J. ROY   1,793,511
CHAIN CONNECTER
Filed May 20, 1930
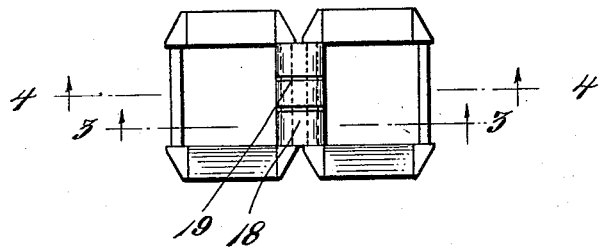
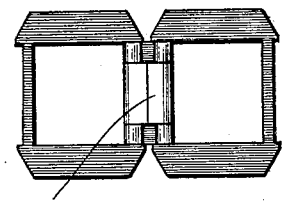
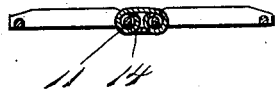
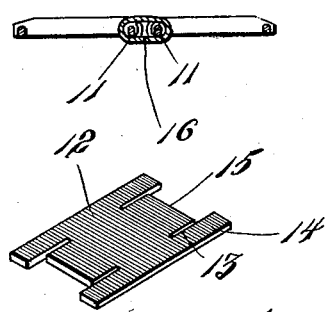
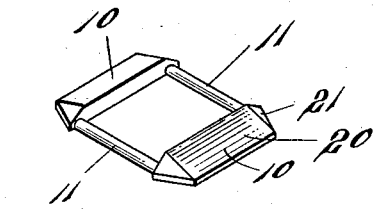
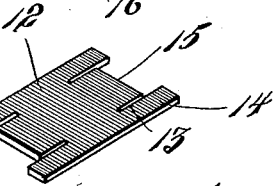
INVENTOR.
Wilfrid J. Roy
BY
Barlow & Barlow
ATTORNEYS.

Patented Feb. 24, 1931

1,793,511

UNITED STATES PATENT OFFICE

WILFRID J. ROY, OF EAST ORANGE, NEW JERSEY, ASSIGNOR TO GEMEX COMPANY, OF NEWARK, NEW JERSEY, A CORPORATION OF NEW JERSEY

CHAIN CONNECTER

Application filed May 20, 1930. Serial No. 454,006.

This invention relates to a connecter member for hingedly joining the cross bars of two adjacent links together; and has for its object to provide a simple and durable construction for connecting the links together and yet one which will present a pleasing appearance when used for jewelry or the like.

A further object of this invention is to provide a connecter member which will have portions embracing the end bars and also a back wall to present a smooth surface to the arm of the wearer.

A still further object of this invention is to provide a connecter for hingedly joining the adjacent links together and definitely spacing the links from each other by eliminating appreciable movement of the links toward or from each other in a direction longitudinally of the chain.

With these and other objects and advantageous features in view, the invention consists of a novel arrangement of parts more fully disclosed in the detailed description following, in conjunction with the accompanying drawings, and more particularly set forth in the appended claims.

In the drawings:

Fig. 1 is a top plan view of a pair of links joined together by my improved connecter member;

Fig. 2 is a bottom view thereof;

Fig. 3 is a section on line 3—3 of Figure 1;

Fig. 4 is a section on line 4—4 of Figure 1;

Fig. 5 is a perspective view of one of the links of the chain; and

Fig. 6 is a perspective view of the connecter member as blanked and slit before being folded to embrace the cross bars of the links of the chain.

In constructing a chain having frame links with open middle portions to permit a ready circulation of air and the like, it is desirable to connect these links together by a sheet metal construction which may be rolled about the end or cross bars of each of the frame-shaped body links, and in order to provide a connecter member of this type, I have folded the same about the end bars of the chain links with its edges abutting to form a complete back for the connecter and a smooth surface for resting upon the wrist, and have slitted portions of the connecter forming fingers which may be rolled completely about each of the end bars to hingedly join them together and prevent movement of the end bars toward or away from each other in longitudinal direction; and the following is a detailed description of the present embodiment of this invention illustrating the preferred means by which these results may be accomplished.

With reference to the drawings, 10 designates the sides of the body link which are connected together by end or cross bars 11 suitably rounded as illustrated in the drawings to permit easy turning within the connecter member.

The connecter member 12 is formed of sheet stock blanked out as shown in Figure 6 with slits 13 providing fingers 14 at either side and at both ends of the member. This member is folded about adjacent cross bars 11 with its edges 15 intermediate the fingers abutting as at 16, illustrated in Figure 4, while the fingers 14 are folded inwardly completely embracing the cross bars 11, as clearly shown in Figure 3, thus preventing movement of the two joined cross bars 11 toward each other longitudinally of the chain but yet providing an extremely flexible connection at two pivotal points for each of the links joined together, and a complete back wall 17, as shown in Figure 2, enhancing the appearance of the chain when viewed from the back and providing a smooth surface to rest against the arm of the wearer.

The top wall 18 of the connecter may be ornamented in any desired manner, such as by slits 19, while the links connected may be beveled on their sides as at 20 and their ends as at 21.

The chain thus formed is one of attractive appearance, is extremely flexible, being permitted to be doubled back upon itself in either direction, and yet one which is sufficiently strong to withstand the strains of usage.

While I have described certain construction forms which embody the principles of my invention, it is obvious that other desired changes in arrangement may be made within the spirit and the scope of the invention as defined in the appended claims.

I claim:

1. In a chain, a plurality of body links having end bars, a member hingedly joining said links and provided with spaced portions embracing the end bars of adjacent links, and the end portions of said member intermediate said spaced portions forming a back wall for said member.

2. In a chain, a plurality of frame links having sides connected at each end by cross bars, a connecter member folded into band-shape about the cross bars of adjacent links with its edges abutting, fingers at each side of said member embracing said bars to hingedly connect the bars together and space said links a predetermined distance apart.

3. In a chain, a plurality of frame links having sides connected at each end by cross bars circular in cross-section, a connecter member folded into band-shape about the cross bars of adjacent links with its edges abutting, fingers slit from said member at each side thereof embracing said bars to hingedly connect the bars together and space said links a predetermined distance apart.

In testimony whereof I affix my signature.

WILFRID J. ROY.